(12) United States Patent
Mills

(10) Patent No.: US 7,121,399 B2
(45) Date of Patent: Oct. 17, 2006

(54) SMALL ITEM PNEUMATIC DIVERTER

(76) Inventor: George A. Mills, P.O. Box 1020, Three Rivers, CA (US) 93271

( * ) Notice: Subject to any disclaimer, the term of this patent is extended or adjusted under 35 U.S.C. 154(b) by 0 days.

(21) Appl. No.: 10/371,859

(22) Filed: Feb. 21, 2003

(65) Prior Publication Data

US 2004/0163929 A1  Aug. 26, 2004

(51) Int. Cl.
*B65G 47/26* (2006.01)
(52) U.S. Cl. ............ 198/438; 198/644; 198/370.11; 406/95; 209/644; 209/932
(58) Field of Classification Search ........... 198/438, 198/370.11; 209/644, 932; 406/93, 94, 406/95; 222/422.13; 239/556
See application file for complete search history.

(56) References Cited

U.S. PATENT DOCUMENTS

| | | | | |
|---|---|---|---|---|
| 3,770,111 | A * | 11/1973 | Greenwood et al. | ......... 209/580 |
| 3,921,809 | A * | 11/1975 | Smith | ......................... 209/633 |
| 4,106,628 | A * | 8/1978 | Warkentin et al. | .......... 209/556 |
| 4,249,660 | A * | 2/1981 | Woodland | ................... 209/555 |
| 4,489,822 | A | 12/1984 | Hiebert | |
| 4,515,275 | A | 5/1985 | Mills et al. | |
| 4,534,470 | A | 8/1985 | Mills | |
| 4,572,497 | A * | 2/1986 | Dreschel et al. | ......... 270/58.01 |
| 4,595,091 | A * | 6/1986 | Scopatz et al. | ........ 198/370.07 |
| 4,600,153 | A * | 7/1986 | Stone | ......................... 239/543 |
| 4,645,080 | A | 2/1987 | Scopatz | |
| 4,726,898 | A | 2/1988 | Mills et al. | |
| 4,730,719 | A | 3/1988 | Brown et al. | |
| 4,961,489 | A * | 10/1990 | Warkentin | ............. 198/370.04 |
| 5,322,152 | A * | 6/1994 | Tommila et al. | ............ 194/212 |
| 5,388,682 | A * | 2/1995 | Dudley | ....................... 198/367 |
| 5,474,167 | A * | 12/1995 | Warkentin | ............... 198/890.1 |
| 5,638,961 | A * | 6/1997 | Satake et al. | ............... 209/580 |
| 6,145,650 | A * | 11/2000 | Christ et al. | ................ 198/493 |
| 6,637,600 | B1 * | 10/2003 | Miyamoto et al. | .......... 209/539 |
| 6,799,381 | B1 * | 10/2004 | Cammisano | ................ 34/397 |

* cited by examiner

*Primary Examiner*—Patrick Mackey
(74) *Attorney, Agent, or Firm*—Richard A. Ryan

(57) ABSTRACT

A small item pneumatic diverter for high speed diversion of articles, such as fruit, from a moving conveyor in a product handling system. The pneumatic diverter is particularly suited for diversion of small, relatively fragile articles after they have been optically scanned for size, weight, quality or other characteristics. The diverter has a nozzle connected to an electrical solenoid controlled air valve that is connected to a source of compressed air and a computer for controlling the release of air to the nozzle. The nozzle has a plurality of small discharge ports at one end for discharging air towards an article on the moving conveyor. In one configuration, the nozzle discharges air across the top of a small article to provide lift and against the article to off-load it from the conveyor. A delay mechanism is utilized to selective discharge an article after it has been scanned.

10 Claims, 7 Drawing Sheets

SMALL ITEM PNEUMATIC DIVERTER

BACKGROUND OF THE INVENTION

A. Field of the Invention

The field of the present invention relates generally to conveying systems wherein the conveyor is actively operative to off-load products from the conveying surface. More particularly, the present invention relates to such conveying systems that utilize pneumatic diverters to selectively off-load products from the conveying surface. Even more particularly, the present invention relates to such conveying systems and diverters that are specially configured for use with small and easily damaged products, such as small spherical and ovular shaped fruit and the like.

B. Background

As is generally known, many products are available in different sizes, shapes and levels of quality. This is particularly true with regard to food products, including fresh, dried or processed fruit and vegetables, which must be sorted into different classifications with regard to various specific characteristics for the different types of food products. In general, product handling and sorting activities for the discrimination of individual product units have been in use for some time, particularly in the food product industry. Discrimination of product units in the food industry is generally based on certain selected product qualitites, including such qualities as the size, ripeness and color of the product and/or the amount and type of blemishes and the like on the product. Until somewhat recently, the handling and sorting of products, particularly food products, was primarily accomplished through the use of manual labor by having products conveyed past workers at individual work stations so the workers could review and separate products based on the selected criteria for that product. A principal benefit of manual labor is the versatility of the worker in being able to handle and make selections for different types of products. As is well known in the food industry, however, such labor has become generally more expensive and, due to its seasonal nature, it can be somewhat unreliable with regard to consistency. Due to the difficulties in finding experienced seasonal workers and the normal administrative problems associated with a fluctuating work force, there has been a need for less labor intensive systems.

With regard to automated product handling systems for the food industry, the nature, volume, relative unit cost and variety of different types of food products severely inhibit the ability to design product handling equipment that is uniformly applicable to different foods. Naturally, due to the nature of food products, particularly most fresh fruit and vegetables, the products must be handled with great care to avoid damage to the product that would reduce its market value or, in some cases, its ability to be sold. In addition, the perishable nature and large quantities of products that need to be processed in a short period of time after harvesting makes rapid processing of the food products an economic necessity. However, due to the varied nature of food products, it is difficult for the average food processor to economically justify food processing equipment that is suitable for processing only a very limited type of food product (i.e., one type of fruit or vegetable). As a result, it is generally preferred that any automated food handling equipment which is intended to replace the versatility of the human worker must be configured for use with a number different types of food products. Unfortunately, due to the varied characteristics of food products, this places great demand for versatility on the equipment.

The availability of relatively inexpensive yet high powered computers and computer related and controlled equipment and the ability to use such equipment with ever improving optical sensing equipment has benefitted numerous product handling industries, including the food industry. The use of these computers and optical sensors, and the relatively sophisticated software available for such computers and sensors, has vastly improved the capability for detecting the size and condition of individual product units and distinguishing between the units based on the desired selection criteria. This equipment is used with conveyor lines that move the product into position for scanning and then move the product to a storage or shipping container that is appropriate for the category of product (i.e., based on the selection criteria). In conjunction with the equipment to optically scan and characterize products, the handling equipment requires the use of responsive mechanisms that rapidly respond to commands from the computerized equipment so as to off-load products from the conveyor system into the appropriate container. If the product fails to meet the minimum allowable criteria, it is generally conveyed to a separate container or location for discarding.

Automated responsive mechanisms suitable for off-loading products in response to commands from the computer and optical scanning equipment require a somewhat exacting placement of individual product units relative to the responsive mechanism, sufficient separation of product units from each other, proper orientation, and if necessary reorientation, of the product unit relative to the responsive mechanism and an ability to quickly separate the product unit from the conveying line. In separating the product from the conveying line, it is generally necessary that this be done with some care relative to the product so as not to damage the product. This is particularly a concern in the food industry and, even more particularly, with certain types of foods. In general, responsive mechanisms for larger fruit and vegetables, such as citrus, apples and tomatoes, have been in use for some time. The ability to properly handle certain types of food products, such as cherries and the like, in an automated handling system has been very limited due to their small size, relative fragility and characteristics of the product (i.e., long stems).

With regard to the typical food product handling system for fresh fruit, the products are loaded into multiple single file lanes, each consisting of linear pockets that are typically mounted on a roller chain or cables. Being generally spherical in shape, each individual fruit product will generally find a pocket for itself. This process is generally referred to as "singulation." Typically, the lanes are separated from each other by a gap so that any excess fruit will fall onto a return belt. The fruit lanes proceed through an inspection box, where the fruit is illuminated by radiation, typically by fluorescent lamps, and inspected by sensors, which are typically black and white or color area array video cameras of medium resolution. If the pockets comprise rotatable rollers, the fruit may be rotate during the inspection process to allow different sides of the fruit to be analyzed. The camera video signal is digitized and analyzed by a computer. The fruit pockets are tracked by the computer using a shaft encoder monitoring the progress of the pocket lanes. The images are analyzed to obtain the diameter/size, average color (i.e., green, yellow, orange), surface defects and/or other information pertinent to the particular fruit. The operator of the system has a console where he or she selects which combinations of size/color/defect grade are to go to each output belt on the grader. These output belts generally pass perpendicularly under the lanes such that when the fruit/ pocket reaches the proper output belt, a computer controlled electrical device is activated to trigger the responsive mechanism so that it lifts, pushes or drops the fruit out of the pocket where it falls onto the moving output belt.

Referring to the related patents discussed below, various responsive mechanisms evolved to remove the fruit from the lane. For larger fruit, the generally preferred system has flippers and a connected lever arm that is mounted between each roller at the bottom of the pocket. When the fruit is at the ejection point, a solenoid actuator trips the lever arm into a different channel such that the chain motion causes the flipper to rotate up from one side, thereby pushing the fruit off the other side of the pocket and onto the belt.

An early automatic sorting system for handling of products is disclosed in U.S. Pat. No. 4,106,628 to Warkentin et al., which describes a plurality of cups arranged on a chain conveyor for holding individual product units. Solenoids act to dump selected cups for product separation responsive to discriminating sensing and electronic commands. U.S. Pat. No. 4,961,489, also to Warkentin, discloses a product handling system having a conveyor that includes elements capable of tipping to off-load individual units of a product being processed. The nature of the conveyor permits some variety in shapes and sizes, including elongated products. However, a range of round or oval products in smaller sizes is not as easily accommodated by this system. U.S. Pat. No. 5,474,167, also to Warkentin, discloses an off-loading conveying system having off-loading elements mounted to endless roller chains. The off-loading elements include levers to pivot paddles extending between bow tie rollers so as to remove the product at the appropriate stations. The system is particularly configured to handle small, easily damaged spherical and ovular shaped product units in a high-speed, electronically controlled processing stream of product units. U.S. Pat. No. 4,595,091 to Scopatz et al., describes an article diverter having an ejector lever member for rapidly and gently diverting articles such as fruit from a moving conveyor.

Other product handling systems include devices for batting, tipping, pushing, dropping, blowing or otherwise depositing selected product units from the lane conveyors to the output belts or containers. The use of a pneumatic air system to blow large fruit of the side of cables with a single port nozzle has been tried. However, this system is believed to have failed because the air damaged the larger fruit and the amount of air needed to operate the system required unfeasibly large compressors. Others, such as Key Technology and SRC Vision have used a horizontally space air nozzle array to divert small items falling off the end of the conveyor. Blueberry Equipment Incorporated has an electronic sorter that ejects defective units, such as blueberries and cranberries, by blowing them straight up as they pass by between two cables. A single port nozzle is used between each cable. Because this could harm some fruit, they are generally only used for good versus bad separation.

With regard to certain types of products, however, the mechanical devices typically utilized have certain problems. For instance, cherries typically have one to two inch long stems that can become caught in mechanical diverters, such as the chain mounted removal mechanisms. Consumer market cherries are generally sized into four different sizes. Because of the long stems, a special sizing system for cherries has been developed and is now used universally. This sizer organizes the incoming cherries in rows and each row enters the valley formed by two long tubes about six to eight ft long. The axis of each tube is about 45 degrees downward, so the cherries then tumble down. The spacing between the tubes widens as they tumble down, with the smaller ones (smallest size) passing through first, onto a belt, and so on. The rolls are also counter rotating to keep cherries from jamming. There are several variations of this basic two tube system designed to improve the sizing accuracy, which is particularly difficult, as the diameter of each packed size are quite close to each other. For instance, the smallest size for Bing type cherries is 12 Row, with a minimum diameter of $54/64$ inch, the minimum for a 11½ Row is $57/64$ inch and the 11 Row is $61/64$ inch. The other complicating thing is that the cherry diameter is the maximum diameter as viewed by looking straight down from the stem end. In most cases, this diameter is the largest width on the cherry, as they are three dimensional fruit. In general this diameter is not what is actually measured by the mechanical cherry system used as described above. Electronic sizing systems using video cameras could find the correct diameter more reliably.

Although the prior art discloses product handling systems for handling and sorting small, somewhat delicate fruit such as cherries and the like, none of the presently known product handling systems provides a responsive mechanism or diverter particularly suitable for sorting small, relatively delicate products, such as cherries and the like, into closely separated categories according to selected characteristics of the products (i.e., size, color, quality and etc.). The known mechanical devices and pneumatic devices do not function as desired. What is needed, therefore, is a small item diverter mechanism suitable for rapidly responding to electronic commands to cause products to be sorted according to selected criteria.

SUMMARY OF THE INVENTION

The small item pneumatic diverter for product handling systems of the present invention solves the problems identified above. That is to say, the present invention discloses a pneumatic diverter particularly configured to rapidly and accurately sort small, relatively delicate products into selected categories according to specified criteria for those categories. The small item pneumatic diverter of the present invention is particularly suited for high speed processing of a stream of product units, such as cherries and the like, in an electronically controlled product handling system. In addition, the pneumatic diverter of the present invention reduces the number of parts necessary to divert small items from a conveyor system, which reduces the likelihood of mechanical problems and cost of manufacturing such systems and improves the reliability of the system and its to operate at higher conveyor speeds.

In one aspect of the present invention, the small item pneumatic diverter is configured for use for high speed diversion of articles from a moving conveyor in a product handling system having a source of compressed air and a computer system. The diverter has an air valve in pneumatic communication with the source of compressed air and in operative communication with the computer system and a nozzle in pneumatic communication with the air valve. The nozzle has a nozzle body with a first end and an opposing second end. The first end of the nozzle body is connected to the air valve and the second end has a plurality of spaced apart discharge ports. The nozzle body is configured with an internal channel to allow compressed air to flow from the air valve to the plurality of discharge ports. Each of the plurality of discharge ports are in spaced apart relationship with each other and in a vertical relationship relative to the articles on the moving conveyor. Typically, the nozzle body will have a connector for connecting the nozzle to the air valve. In the preferred embodiment, the plurality of discharge ports includes an upper discharge port, a lower discharge port and one or more middle discharge ports disposed between the upper and lower discharge ports. Also in the preferred embodiment, for small articles, the upper discharge port is configured to discharge compressed air across the top of the article and the discharge ports are configured to discharge a plurality of horizontal air streams toward the article.

In another aspect of the present invention, the diverter is used in a product handling system having a moving conveyor configured to transport the articles, an inspection means along the conveyor for inspecting the plurality of articles on the conveyor, and a diverter in communication with the computer system for selectively off-loading an article from the conveyor. The moving conveyor is operatively mounted on a support structure and the inspection means is in operative communication with a computer system for reviewing the articles one at a time. The diverter has an air valve in pneumatic communication with a source of compressed air and a nozzle in pneumatic communication with the air valve. The nozzle has a nozzle body with a first end and an opposing second end, with a plurality of spaced apart discharge ports located at the second. The nozzle body is configured to allow compressed air to flow from the air valve to the plurality of discharge ports, which are in a vertical relationship relative to the articles on the moving conveyor. In the preferred embodiment, the product handling system has a delay mechanism interconnecting the computer and the diverter for delaying the discharge of compressed air through the plurality of discharge ports until the article is at or near the nozzle so that the article may be off-loaded into a basket or other output collection mechanism. As above, the plurality of discharge ports can include an upper discharge port, a lower discharge port and one or more middle discharge ports configured to discharge compressed air across the top of the article and a plurality of horizontal air streams at the article.

Accordingly, the primary objective of the present invention is to provide an improved, versatile small item diverter suitable for use in a high-speed product handling and sorting system that overcomes the disadvantages associated with presently available diverters.

It is also an important objective of the present invention to provide a pneumatic diverter that is particularly suited to divert small, relatively fragile items from a moving conveyor so as to sort such items into different categories according to selected criteria for the item.

It is also an important objective of the present invention to provide a small item pneumatic diverter that is suitable for rapidly responding to commands from an electronically controlled system so as to sort the small items into different categories.

It is also an important objective of the present invention to provide a small item pneumatic diverter that is particularly suited for use in a high-speed processing line for handling and sorting fruit such as cherries and the like.

The above and other objectives of the present invention will be explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, and particularly with reference to the embodiment of the present invention illustrated in FIGS. 1 through 7, the preferred embodiments of the present invention are set forth below. The pneumatic diverter of the present invention, identified generally as 10, is configured for use in a product handling system 12, such as those used to handle and sort cherries, kiwi and other fruit. The diverter 10 of the present invention may be incorporated into product handling systems as described in U.S. Pat. No. 4,106,628 to Warkentin and Mills, U.S. Pat. No. 4,515,275 to Mills and Richert, U.S. Pat. No. 4,534,470 to Mills and U.S. Pat. No. 4,726,898 to Mills and Brown (collectively, these patents are referenced as the "Patents"). The Patents disclose various attributes, including mechanical features, of product handling systems 12 that can be used with diverter 10 of the present invention. The disclosures of the Patents are incorporated herein by reference. In addition, various peripheral devices and processes known in the industry are intended to be incorporated into the product handling system 12 described herein for use with diverter 10 for high speed diversion of articles from a moving product line.

Figure 1:
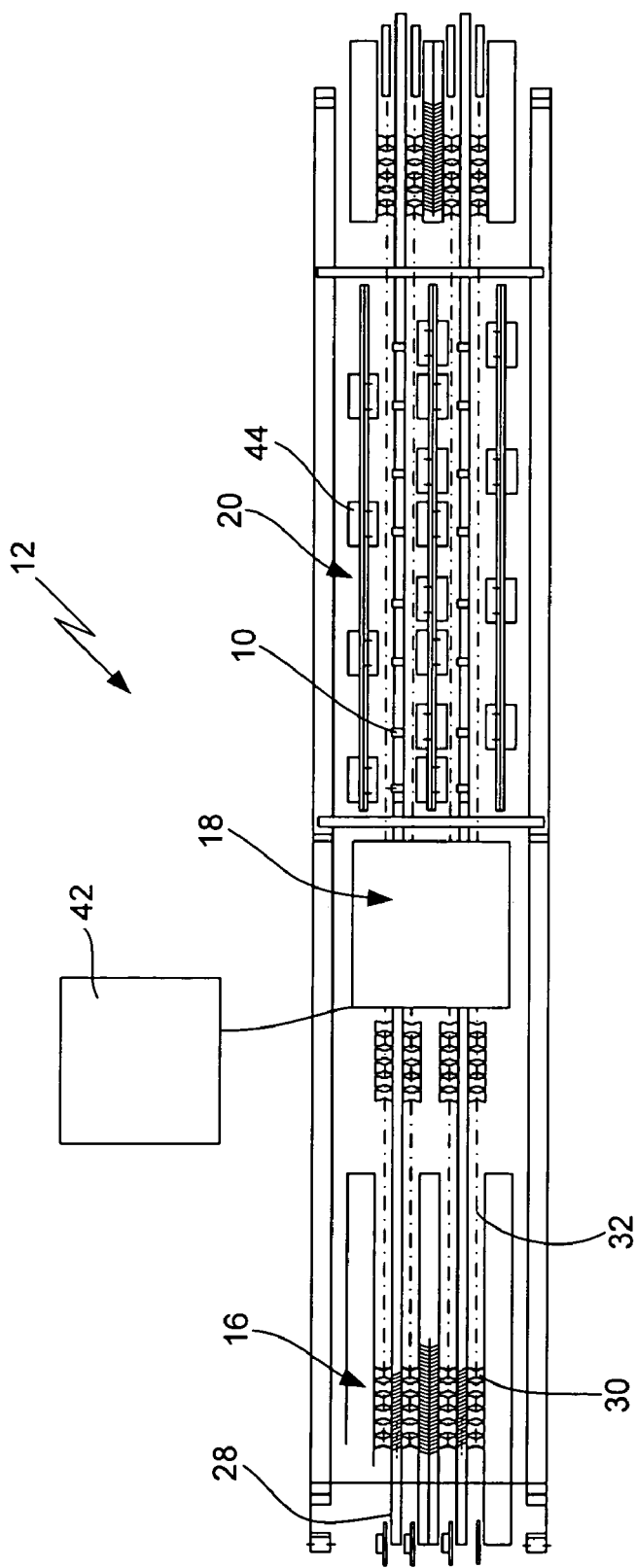
FIG. 1 is a top plan view of a product handling system configured for use with the diverter of the present invention.
Figure 2:
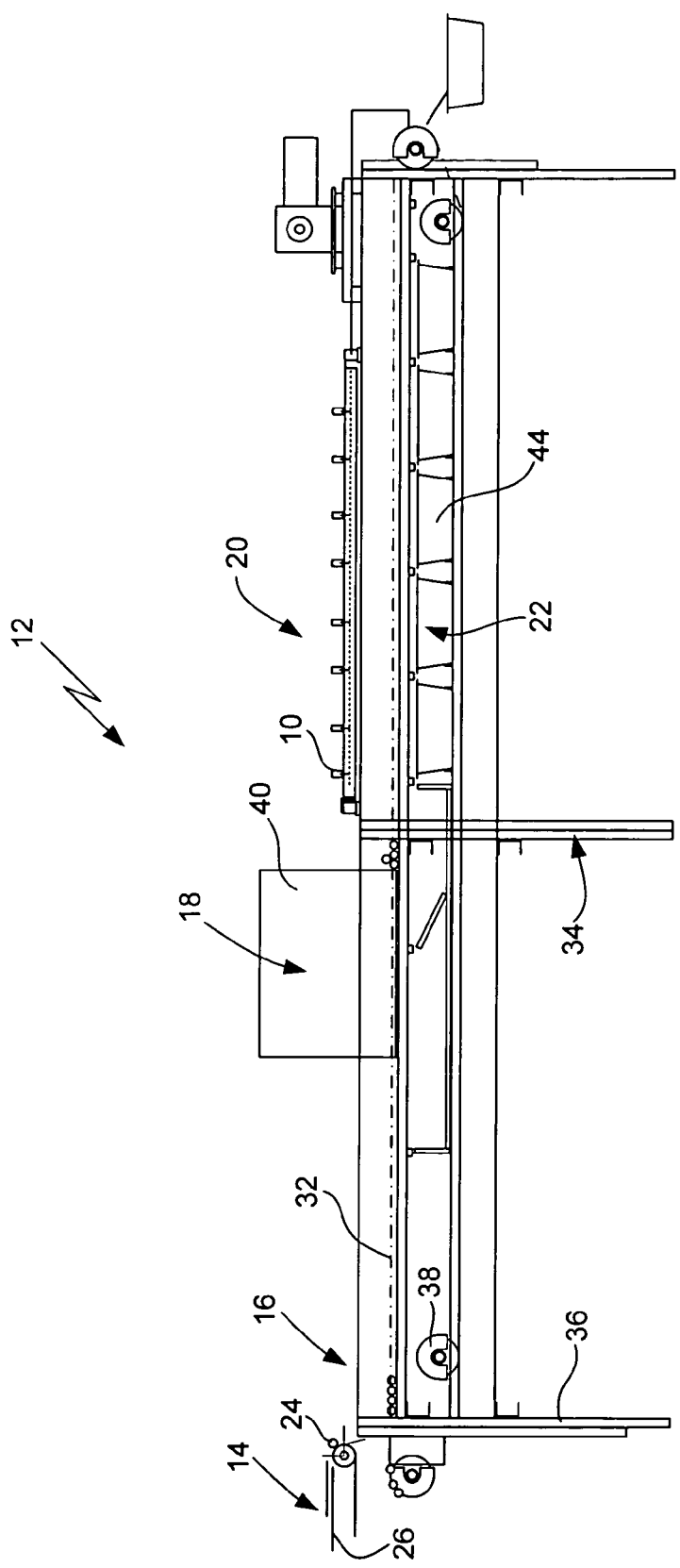
FIG. 2 is a side plan view of the product handling system of FIG. 1.
Figure 3:
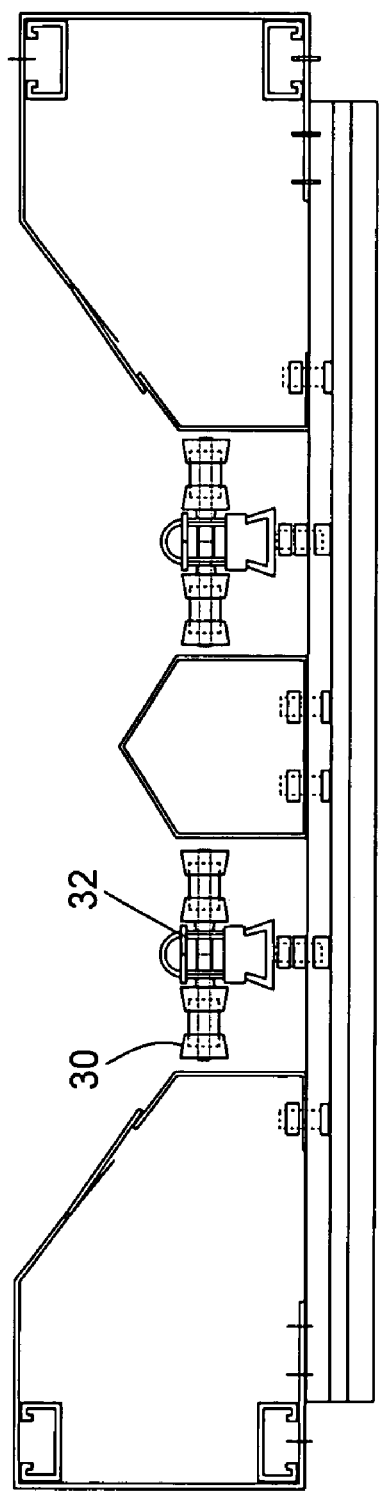
FIG. 3 is an isolated section view showing the rollers and endless roller chain used to convey articles through the product handling system of FIGS. 1 and 2.

A typical product handling system 12, shown in FIGS. 1 through 3, generally comprises feed-in section 14, singulator section 16, sorting section 18, diverter section 20 and output section 22. Articles to be sorted, such as fruit 24 (shown in FIG. 2 and FIG. 4) are generally received from chutes, not shown, onto a first conveyor 26 in feed-in section 14 and conveyed to singulator section 16. Singulator section 16 has one or more lanes of singulator conveyors 28, four are shown in FIG. 1, comprised of a plurality of spaced apart conveyor rollers 30, best shown in FIG. 3, rotatably mounted on each side of endless roller chain 32, which advance fruit 24 from left to right. Endless roller chain 32 will typically have a chain guard (not shown) to keep fruit 24 off of the chain portion, made up of multiple joined link elements forming a plurality of links, of endless roller chain 32. Singulator section 16 is typically configured such that any fruit 24 that falls off of the singulator conveyors 28, typically due to having more than one fruit unit on one roller 30 at a time, will fall below endless roller chain 32 onto a lower conveyor section (not shown) that conveys the fallen fruit back up to feed-in section 14 or the entrance to singulator section 16.

As shown in FIG. 2, endless roller chain 32 and the remaining components of product handling system 12 are supported off the ground by a support structure 34 that includes a frame 36 having a plurality of sprocket wheels 38 that are used to conventionally mount endless chain 32. Endless roller chain 32 is driven in a conventional manner by a motor about sprocket wheels 38. Conventional runners (not shown), disposed on the upper portion of support structure 34, support and guide the endless roller chain 32 along each lane. Rollers 30 mounted to endless roller chain 32 support fruit 24 as it move along the high speed conveying line. As is known in the art, rollers 30 may be of the "bow tie" type of shaped elements that are rotate on rods or other members relative to endless chain 32. As also known in the art, rollers 30 may be advantageously configured to cause fruit 24 to spin or rotate thereon so as to place fruit 24 in the desired position for inspection in sorting section 18. An example of rollers 30 configured for orientation of fruit 24 is disclosed in U.S. Pat. No. 4,730,719 to Brown, et al.

Singulator conveyors 28 convey fruit 24 through sorting section 18, which comprises an optical scanning unit 40 housing one or more illuminators (not shown) for uniformly illuminating the surface areas of fruit 24 as it passes through scanning unit 40 for testing and/or evaluation. The illumination can be accomplished with visible, ultraviolet or infrared radiation, depending on the specific application desired. One common form of illumination is accomplished through the use of one or more flourescent lights. The illuminators direct their radiation to the surfaces of fruit 24 at various angles so as to illuminate the surfaces of fruit 24 for the scanning camera (not shown), also inside scanning unit 40. The scanning camera is in operative communication with computer system 42 and generates video signals for controlling diverter 10, as explained in more detail below, to select, sort and reject fruit 24 depending on criteria for fruit 24. The scanning camera may comprise a television camera or other form detection system, such as a discrete detector array. The video signals generated by the scanning camera are digitized and fed into computer 42 capable of performing evaluation of the fruit in accordance with the selected criteria important for the particular fruit 24 being inspected. The determined grade signals suitably control the operation of pneumatic diverter 10 on each lane for ejecting items into output section 22.

FIGS. 1 and 2 show the use of receiving containers, such as buckets 44 below singulator conveyors 26 after optical scanning unit 40 to receive the off-loaded fruit 24 from singulator conveyors 26. Fruit 24 is off-loaded by action of diverter 10, as explained in more detail below, in response to commands received from computer system 42 as a result of analysis performed on fruit 24. For most fruit 24, the object of diverter section 20 and output section 22 is to gently off-load fruit 24 into the appropriate containers depending on the grade, color, size and/or other criteria for fruit 24. In the configuration shown in FIG. 2, the first four buckets, from the left, are placed to receive selected fruit 24 according to the desired criteria and the last (i.e., fifth) bucket is to receive items that do not meet any of the desired criteria. Alternatively, fruit that does not get off-loaded because of selection criteria can be configured to go off the end of the product handling system 12. In addition to buckets 44, other containers, such as bags, boxes or the like, may be used to receive off-loaded fruit 24. Alternatively, fruit 24 may be off-loaded into a flume, shoot, conveyor, collecting tray or other arrangement for transfer to another part of product handling system 24 for packaging or further inspection, weighing or other action. If conveyors are used to receive the off-loaded fruit, they are typically configured to be located below and perpendicularly displaced relative to the lanes of singulator conveyors. As is known in the art, such conveyors could comprise flexible take-out belts to cushion the fall of fruit 24 from singulator conveyors 28 after diversion by pneumatic diverter 10 of the present invention.

Figure 4:
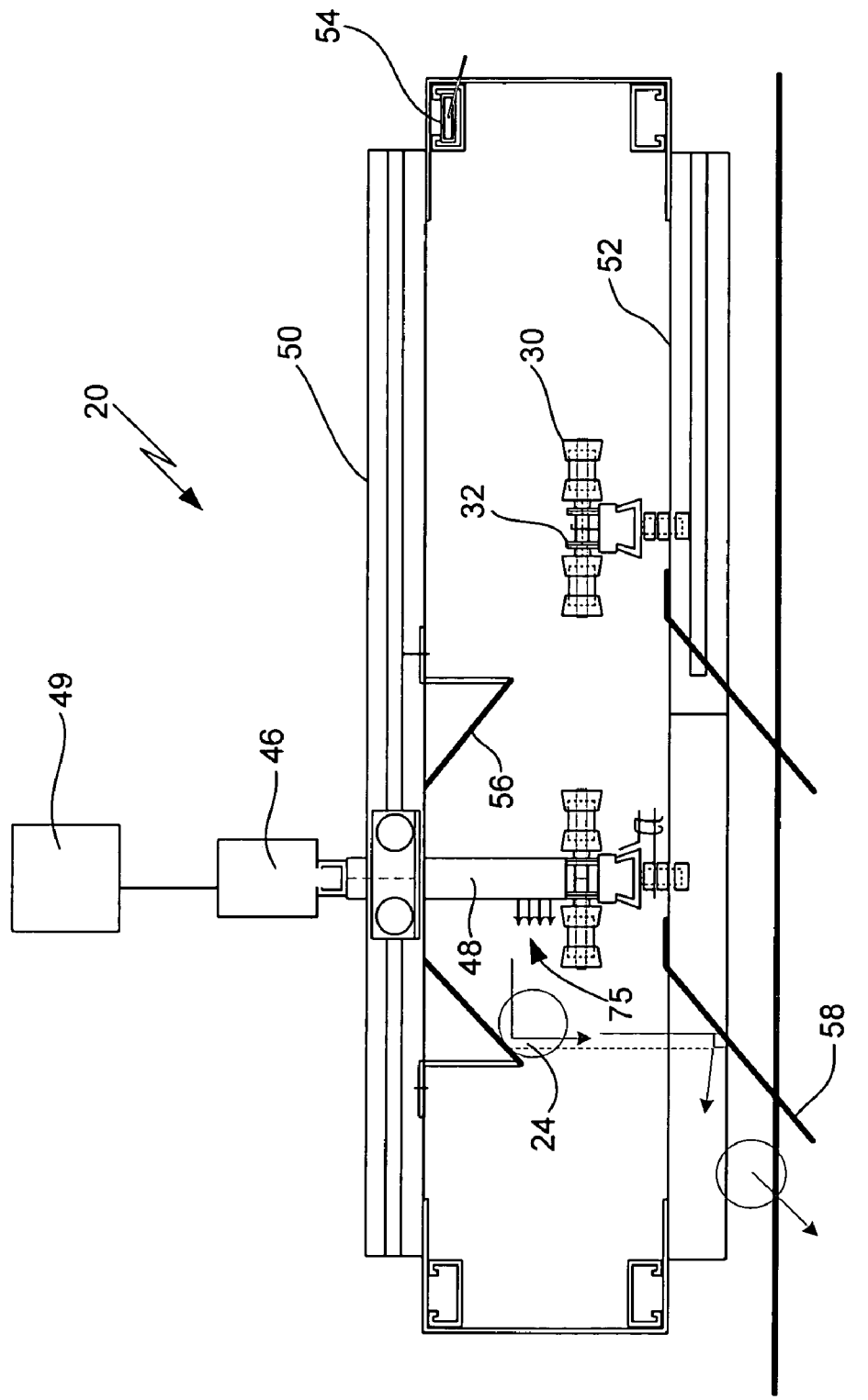
FIG. 4 is an isolated section view through the diverter section of the product handling system showing the pneumatic diverter of the present invention.

Diverter section 20, best shown in FIG. 4, comprises pneumatic diverter 10 and various components to assist with the off-loading of fruit 24 or other items into output section 22. As shown, diverter 10 comprises an electrical solenoid controlled air valve 46 operatively interconnecting a source of compressed air (shown as 49 in FIG. 7) and nozzle 48 to divert fruit 24 off of rollers 30 as the fruit 24 passes by nozzle 48. Air valve 46 can be of the two-way type of air valve suitable for receiving and distributing compressed air. As shown in FIG. 4, air valve 46 may be mounted on a horizontally displaced ejector mount 50 mounted above and to guide rails 52 used to mount the components for endless roller chain 32 using one or more spring nuts 54. Alternatively, air valve 46 and/or nozzle 48 may be mounted from below if the system 12 is configured to accept such mounting. As described in more detail below, nozzle 48 is specially configured to gently remove fruit 24 from one of the pair of rollers 30 disposed on either side of endless roller chain 32 and nozzle 48. In one configuration compressed air is supplied at approximately 50–110 psi. This amount could vary up or down depending on the size, weight or configuration of fruit 24 or the other items and other factors with regard to the need for high speed diversion of such items from singulator conveyors 28. As shown in FIG. 4, if desired or necessary, depending on the fruit 24 or other item being processed, an upper deflector 56 and/or a lower deflector 58 may be utilized to deflect the fruit into output section 22. As is known in the art of fruit handling systems, any such deflectors 56 and 58 should be made out of materials and configured to gently receive and deflect the fruit 24 into output section 22 so as not to cause an bruising or other damage to fruit 24. One such material is a rigid, rubberized fabric or other piece of cloth. For some fruit 24 or other items, it may not be necessary to utilize deflectors 56 or 58. A deflector strap can be placed between pneumatic diverters 10 over the endless roller chain 32 so fruit 24 will not make contact with the endless roller chain 32 when it is off-loaded from the singulator conveyors.

Nozzle 48 of the pneumatic diverter 10 of the present invention is specially designed for high speed diversion of small articles, such as fruit 24, from a moving line of such articles. As shown in FIG. 4, in a preferred embodiment of the present invention, nozzle 48 is positioned between a pair of rollers 30 such that first end 60 of nozzle 48 is slightly above endless roller chain 32 along side rollers 30 and second end 62 of nozzle 48 operatively connects to air valve 46. Nozzle 48 is configured so as to transfer compressed air to the plurality of discharge ports 64, shown in FIGS. 5 and 6, on side 66 of nozzle body 68. In diverter section 20, nozzle 48 is configured such that side 66 having discharge ports 65 is facing the moving fruit 24 on singulator conveyors 28 so as to cause fruit to be off-loaded into output section 22. Second end 62 of nozzle body 68 can be configured with either a female connector 70 or a male connector (not shown) to operatively connect to air valve 46. An internal channel 72 interconnects connector 70 to discharge ports 64.

Figure 5:
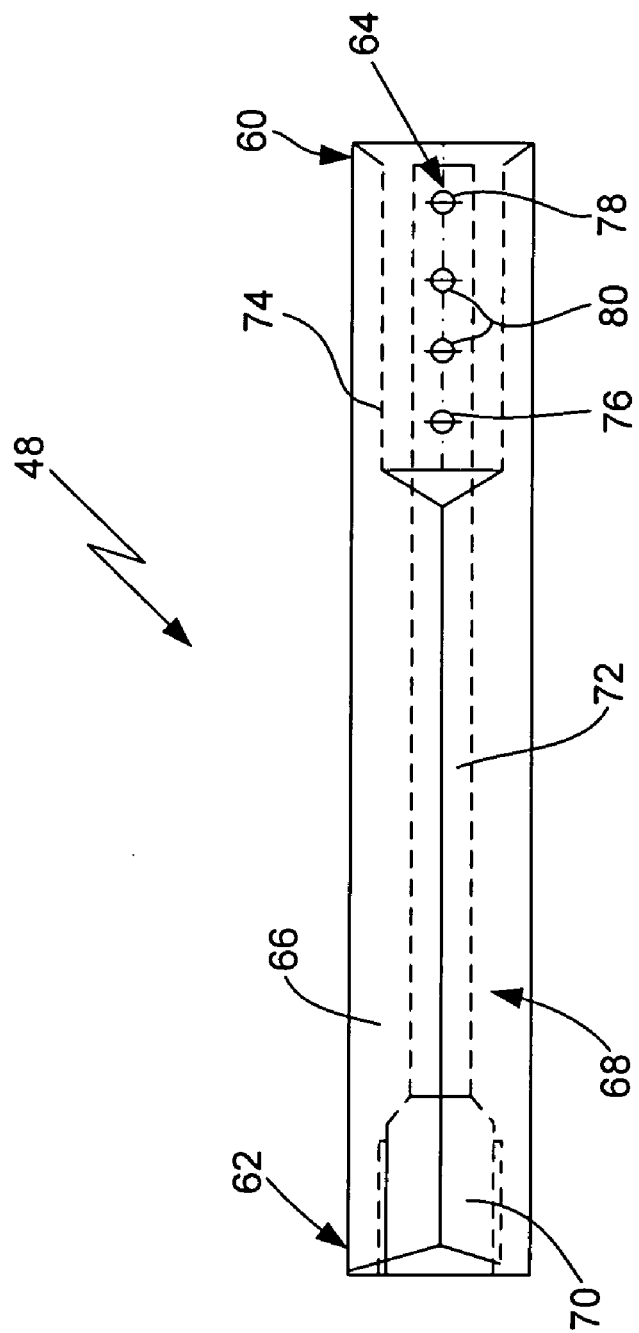
FIG. 5 is side view of the nozzle component of the diverter of the present invention.
Figure 6:
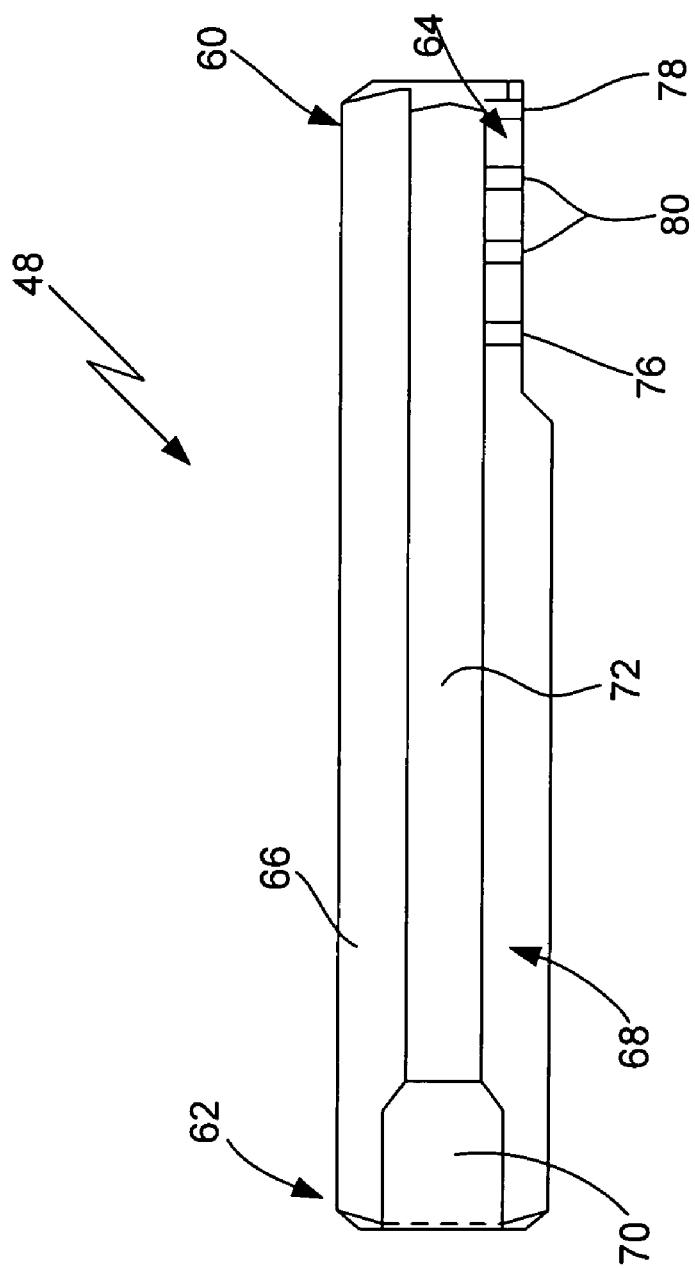
FIG. 6 is cross-sectional view of the nozzle of FIG. 5 showing the internal channel and plurality of discharge valves.

In a preferred embodiment, shown in FIGS. 5 and 6, discharge ports 64 are disposed in a cut-out section 74 of nozzle body 68 at first end 60 thereof. Nozzle body 68 can be made from a variety of materials, including metals such as aluminum and stainless steel, composite materials and various plastics, depending on the air pressure needed and other considerations, such as corrosiveness of the environment in which it is used.

As shown in FIGS. 5 and 6, a preferred embodiment of the present invention utilizes four discharge ports 64 in nozzle body 66. After experimenting with a single discharge port, the inventor found that small, relatively light weight items, such as cherries, would be blown too hard, causing them to travel too far or hit upper deflector 50 too hard, or they would be blown off at undesirable angles. Larger items, such as larger fruit 24, would not be moved very much by air from a single discharge port 64. The use of a single discharge port 64 created a problem for optimal placement of nozzle 48 relative to fruit 64, as it depended on the size of fruit 24. As a result, at a given setting for single discharge port 64, some fruit 24 would take a severe upward and/or sideward trajectory, missing the desired exit location.

To solve the problems with a single air stream from a single discharge port 64, the inventor found that multiple horizontal air streams, shown as 75 in FIG. 4, would provide consistent removal of both large and very small items, such as fruit 24, of a given lot at approximately the same exit speed. Use of at least an upper discharge port 76 and a lower discharge port 78 provided substantial benefits with regard to off-loading fruit 24 or other items of different size. The preferred embodiment also utilizes one or more middle discharge ports 80, two are shown in the figures, for more uniform and consistent removal of fruit 24 from singulator conveyors 28. The discharge ports 64 are configured such that upper discharge port 76 blows air at or across the top of fruit 24, lower discharge port 78 blows at the bottom of fruit 24 and middle discharge ports 80 blows into the side of fruit 24. The transfer of air across the top of fruit 24 from upper discharge port 76 slightly lifts the fruit 24 out of the valley located at the bottom of rollers 30, similar to the effect of air traveling over the top of an air foil (aerodynamic lift). This is particularly important for smaller items, such as small fruit 24, that have a tendency to get jammed in the valley of roller 30. Diverter systems that physically knock fruit from between the roller valleys have been known to have a problem with smaller items, such as fruit 24.

Various factors affect the effectiveness of ejecting fruit at the proper direction and at sufficient speed to accomplish the objectives of the present invention. These factors include the weight and size of fruit 24, the linear speed of rollers 30 (they are not rotating fruit 24 during ejection), the air supply pressure and an electrical air control pulse one shot duty cycle (which is the percentage of distance traveled, compared to the roller spacing, for the electrical solenoid control pulse sent by computer system 42). The faster the linear speed of rollers 30 and/or the larger fruit 24, the higher the air pressure must be to operate effectively. As an example, a ten gram fruit (i.e., about 1.0 inch in diameter) at a linear roller speed of 26 inches per second (about 20 fruit per second), requires approximately 90 psi air pressure.

Figure 7:
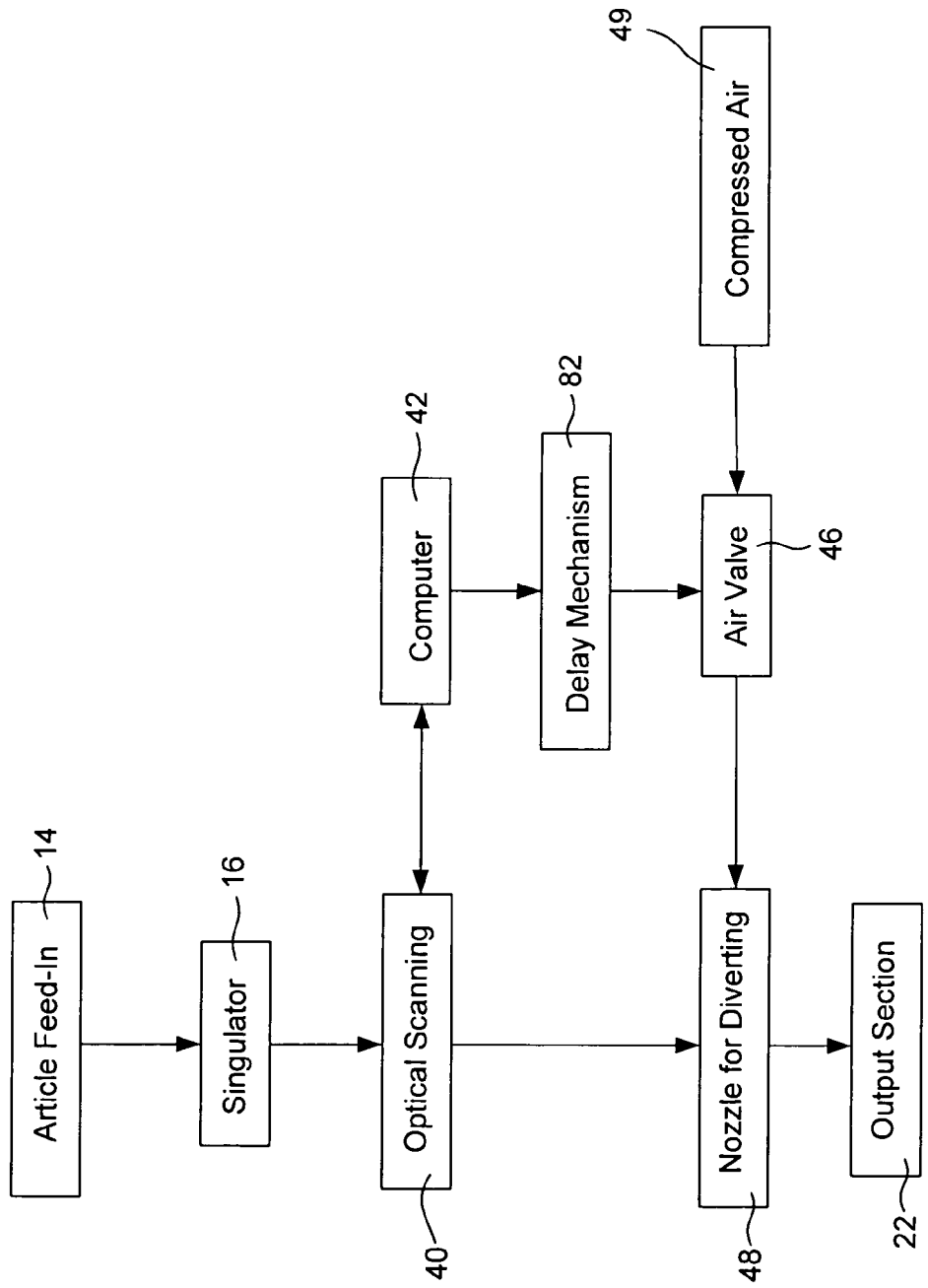
FIG. 7 is a chart showing the flow articles through the product handling system described above.

In a preferred embodiment, nozzle body 68 is made out of aluminum and has four discharge ports 64 near first end 60 of nozzle body 68. In this configuration, discharge ports 64 can be approximately 0.045 inches in diameter and be located on approximately 0.280 inch centers, providing a distance of about 0.840 inches between lower discharge port 78 and upper discharge port 76. Fruit 24 having a diameter of less than about 0.75 inches has air moving past the top, tending to provide it the slight lift described above. The inventor has found that this configuration results in fruit 24 having a diameter of 0.5 inches to 1.0 inches come off the rollers 30 at an upward angle. Even very small fruit 24, such as those sitting below lower discharge port 78 are off-loaded from the singulator conveyors 28. Because air cannot be discharged through nozzle 48 the entire time, as it would off-load all fruit coming past it, delay mechanism 82, illustrated in FIG. 7, is necessary to provide controlled air release. Delay mechanism 82 is provided to provide an electrical pulse to the solenoid controlled air valve 46 at the proper time that fruit 24 is present at the output section 22 where the fruit 24 is to be deposited. In the preferred embodiment, delay mechanism 82 is part of the software associated with computer system 42. Alternatively, a mechanical delay mechanism can be provided. The inventor has found that a duty cycle of about 75% has been effective.

In use, as summarized in FIG. 7, fruit 24 or other items are placed into feed-in section 14 which deposits them into singulator section 16 for placement into separate lanes of singulator conveyors 28 to convey the fruit 24 to sorting section 18, where it passes through an optical scanning unit 40 or other sorting device. A computer system 40 in communication with the camera in optical scanning unit 40 scans fruit 24 to make a determination as to what category fruit 24 should be place, depending on criteria for the particular fruit 24. As fruit 24 continues to move forward, a determination is made as to what category it belongs in and a signal is sent to pneumatic diverter 10 in diverter section 20 to off-load fruit 24 into output section 20. Electrical controlled solenoid air valve 46 receives air from a source of compressed air 49 and releases air through a plurality of discharge ports 64 in nozzle 48 to off-load fruit 24 to output section 22. Depending on the size of fruit 24, air from one of the discharge ports 64, such as upper discharge port 76, will pass across the top of fruit 24 so as to cause a slight lift to make it easier to push fruit 24 off singulator conveyor 28 by middle 80 and/or lower 78 discharge ports to output section 22.

While there are shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape and use. In addition, although shown and discussed for use with fruit, pneumatic diverter 10 of the present invention is adaptable for use with other items that may require high speed diversion from a moving line.

What is claimed is:

1. A product handling system for sorting a plurality of articles, comprising:

a moving conveyor configured to transport said articles, said moving conveyor operatively mounted on a support structure;

an inspection means along said conveyor for inspecting said plurality of articles on said conveyor, said inspection means in operative communication with a computer system for reviewing an article of said plurality of articles; and a diverter in communication with said computer system for selectively off-loading the article from said conveyor, said diverter having an air valve in pneumatic communication with a source of compressed air and a nozzle in pneumatic communication with said air valve, said nozzle having a nozzle body with a first end, an opposing second end and a plurality of spaced apart discharge ports at said second end, said plurality of discharge ports includes at least an upper discharge port, a lower discharge port and one or more middle discharge ports disposed between said upper discharge port and said lower discharge port, said first end of said nozzle body connected to said air valve, said nozzle body configured to allow compressed air to flow from said air valve to said plurality of discharge ports, each of said plurality of discharge ports in a vertical relationship relative to said plurality of articles on said moving conveyor, so as to discharge a plurality of generally horizontal air streams toward the article to selectively off-load the article from said moving conveyor said upper discharge port configured to discharge compressed air across the top of the article, said one or more middle discharge ports configured to discharge compressed air at the side of the article.

2. The product handling system according to claim 1, further comprising delay means interconnecting said computer and said diverter for delaying the discharge of compressed air through said plurality of discharge ports until said article is at or near said nozzle.

3. The product handling system according to claim 1, wherein said nozzle body comprises a connector for connecting said nozzle to said air valve and an internal channel interconnecting said air valve and said plurality of discharge ports.

4. The product handling system according to claim 1, wherein said upper discharge port is configured to apply aerodynamic lift to the article.

5. The product handling system according to claim 4, wherein said lower discharge port is configured to discharge compressed air at the bottom of the article.

6. The product handling system according to claim 1, wherein said nozzle body comprises a connector for connecting said nozzle to said air valve and an internal channel interconnecting said air valve and said plurality of discharge ports.

7. The product handling system according to claim 1, wherein said lower discharge port is configured to discharge compressed air at the bottom of the article.

8. A product handling system for sorting a plurality of articles, comprising:
    a moving conveyor configured to transport said articles, said moving conveyor operatively mounted on a support structure;
    an inspection means along said conveyor for inspecting said plurality of articles on said conveyor, said inspection means in operative communication with a computer system for reviewing an article of said plurality of articles;
    a diverter in communication with said computer system for selectively off-loading the article from said conveyor, said diverter having an air valve in pneumatic communication with a source of compressed air and a nozzle in pneumatic communication with said air valve, said nozzle having a nozzle body with a first end, an opposing second end and a plurality of spaced apart discharge ports at said second end, said plurality of discharge ports includes at least an upper discharge port, a lower discharge port and one or more middle discharge ports disposed between said upper discharge port and said lower discharge port, said first end of said nozzle body connected to said air valve, said nozzle body configured to allow compressed air to flow from said air valve to said plurality of discharge ports, each of said plurality of discharge ports in a vertical relationship relative to said plurality of articles on said moving conveyor, so as to discharge a plurality of generally horizontal air streams toward the article to selectively off-load the article from said moving conveyor, said upper discharge port configured to discharge compressed air across the top of the article and apply aerodynamic lift to the article, said one or more middle discharge ports configured to discharge compressed air at the side of the article; and
    means interconnecting said computer and said diverter for delaying the discharge of compressed air through said plurality of discharge ports until said article is at or near said nozzle.

9. The product handling system according to claim 8, wherein said nozzle body comprises a connector for connecting said nozzle to said air valve and an internal channel interconnecting said air valve and said plurality of discharge ports.

10. The product handling system according to claim 8, wherein said lower discharge port is configured to discharge compressed air at the bottom of the article.

* * * * *